(12) United States Patent
Cullen

(10) Patent No.: US 11,458,906 B2
(45) Date of Patent: Oct. 4, 2022

(54) AUTOMOTIVE TRAY CANOPY

(71) Applicant: PCOR PTY LTD., Brisbane (AU)

(72) Inventor: Bradley Cullen, Molendinar (AU)

(73) Assignee: PATRIOT CAMPERS HOLDINGS PTY LTD, Molendinar (AU)

( * ) Notice: Subject to any disclaimer, the term of this patent is extended or adjusted under 35 U.S.C. 154(b) by 28 days.

(21) Appl. No.: 16/384,228

(22) Filed: Apr. 15, 2019

(65) Prior Publication Data

US 2019/0322163 A1  Oct. 24, 2019

(30) Foreign Application Priority Data

Apr. 18, 2018 (AU) .............................. 2018901286

(51) Int. Cl.
| | |
|---|---|
| *B60R 9/06* | (2006.01) |
| *B60J 7/10* | (2006.01) |
| *E05B 77/46* | (2014.01) |
| *B60R 16/03* | (2006.01) |
| *B60Q 1/24* | (2006.01) |

(52) U.S. Cl.
CPC ............... *B60R 9/065* (2013.01); *B60J 7/10* (2013.01); *B60Q 1/24* (2013.01); *B60R 16/03* (2013.01); *E05B 77/46* (2013.01); *E05Y 2900/531* (2013.01)

(58) Field of Classification Search
CPC ....... B60J 7/08; B60J 7/10; B60J 7/106; B60J 7/16; B60J 7/1607; B60P 3/32; B60P 7/02; B60R 9/065

USPC .............. 296/37.6, 100.01, 100.02, 156, 164
See application file for complete search history.

(56) References Cited

U.S. PATENT DOCUMENTS

| | | | | |
|---|---|---|---|---|
| 7,192,076 | B2 * | 3/2007 | Ottino ..................... | B60J 5/0416 |
| | | | | 296/146.1 |
| 10,000,114 | B2 * | 6/2018 | Rohr ....................... | B60J 7/1607 |
| 10,272,754 | B2 * | 4/2019 | Johnson .................. | B60J 7/106 |
| 2003/0094832 | A1 | 5/2003 | Soldatelli | |
| 2008/0067830 | A1 | 3/2008 | Frankham | |
| 2008/0157556 | A1 * | 7/2008 | Henderson ......... | B62D 33/0273 |
| | | | | 296/37.6 |
| 2012/0235439 | A1 * | 9/2012 | Mazur ..................... | B60J 7/062 |
| | | | | 296/100.03 |
| 2014/0367990 | A1 | 12/2014 | Dost | |

OTHER PUBLICATIONS

Norweld as existed on Mar. 13, 2018; retreived on Aug. 20, 2020 via the INternet Archive WayBack Machine; located at https://web.archive.org/web/20180313194744/https://www.norweld.com.au/american-full-size/. (Year: 2018).*

Uteboss Utility Canopies; Facebook post from Jun. 2, 2017 located at https://www.facebook.com/UtebossUtilityCanopies/posts/we-sell-our-camp-kitchens-separately-and-we-freight-all-over-australia-with-a-sm/1304089933037758/. (Year: 2017).*

(Continued)

*Primary Examiner* — Jason S Daniels

(74) *Attorney, Agent, or Firm* — Tucker Ellis LLP

(57) ABSTRACT

The present application relates to an automotive tray canopy for fitting to a tray of a vehicle. The canopy includes a roof and four walls depending from the roof. A floor extends between the walls. The canopy is portable and may form a completely sealed internal storage space for storing items out of the elements.

17 Claims, 4 Drawing Sheets

(56) References Cited

OTHER PUBLICATIONS

Australian Examination report No. 1 for standard patent application for related Australian application No. 2019202565, dated Jan. 4, 2021, 6 pages.
Canopy Locks [retrieved from the Internet on Jan. 4, 2021] <URL:https://web.archive.org/web/20161026185341/https://www.canopylocks.com.au/>, published on Oct. 26, 2016 as per Wayback Machine.

* cited by examiner

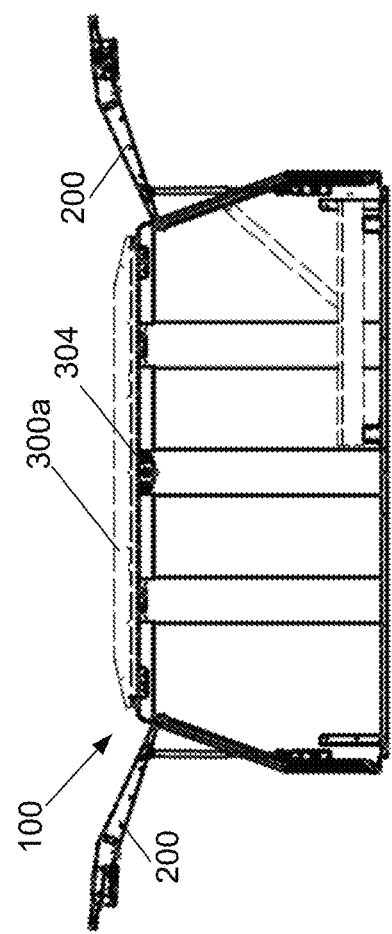
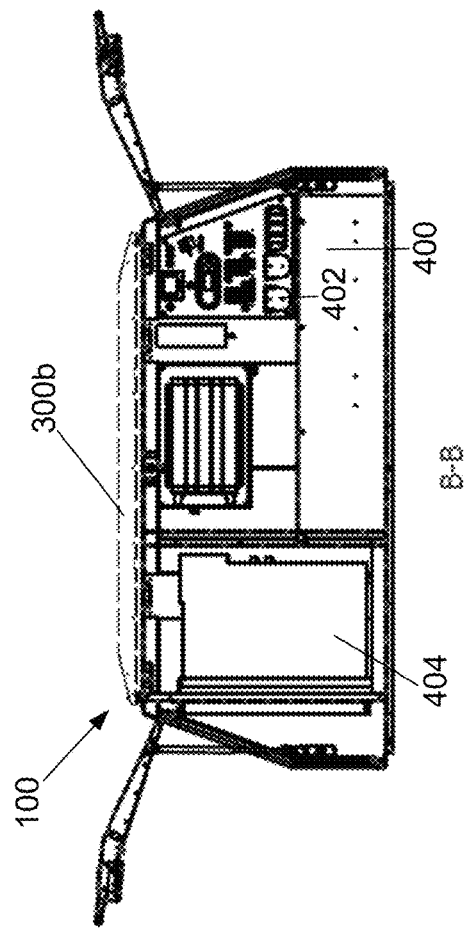
FIG. 3b
FIG. 4b
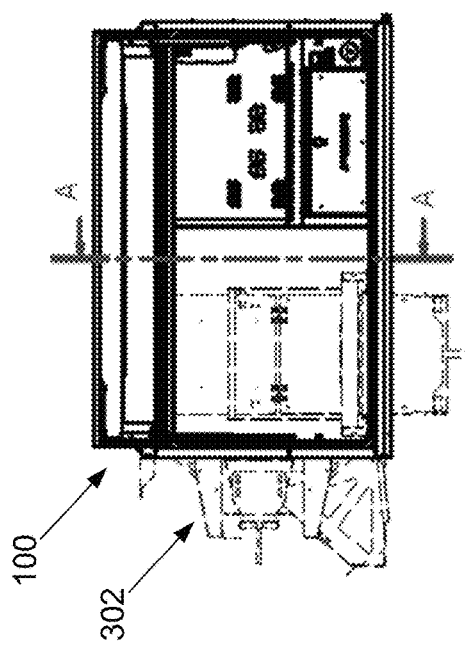
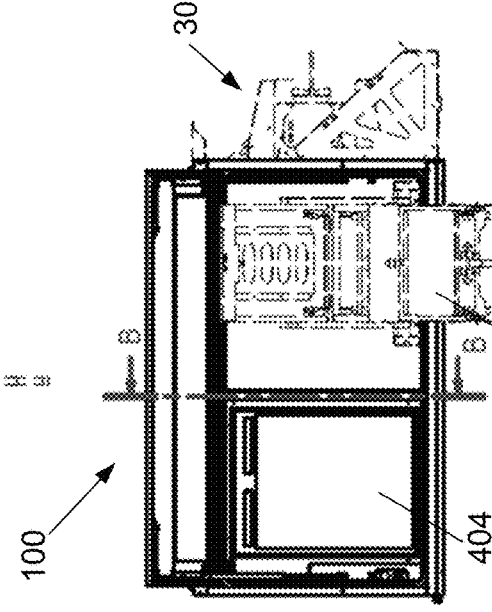
FIG. 3a
FIG. 4a

AUTOMOTIVE TRAY CANOPY

RELATED APPLICATION DATA

This application claims priority to AU 2018901286, filed Apr. 18, 2018, which is hereby incorporated herein by reference.

TECHNICAL FIELD

The present invention relates to an automotive tray canopy. The present invention has particular, although not exclusive application to a portable canopy for retro-fitting to a tray of a utility vehicle ("ute") for camping.

BACKGROUND

The reference to any prior art in this specification is not, and should not be taken as an acknowledgement or any form of suggestion that the prior art forms part of the common general knowledge.

Utility vehicles ("Utes") are often used for four wheel driving and camping whereby camping gear is loaded onto the rear payload tray.

In practice, various items on the tray are unsecured which leaves them exposed to the elements and potential theft.

The preferred embodiment provides an improved arrangement for storing such items.

SUMMARY OF THE INVENTION

According to one aspect of the present invention, there is provided an automotive tray canopy for fitting to a tray of a vehicle, the canopy including:
a roof;
four walls depending from the roof; and
a floor for extending between the walls.

Advantageously, the canopy may form a completely sealed internal storage space for storing items out of the elements. The canopy may include a ventilation system for positively pressurizing the storage space when the vehicle is in motion. Preferably, the canopy is portable.

The walls may include two side walls, at least one side wall including an access door. Each side wall may include an access door. Each access door may pivot upward and downward. The canopy may include a central locking system for locking each door to secure the canopy. The central locking system can be actuated with a key. Each door can locked by locking any one of the doors with the key. The side walls may taper inwardly with increasing height.

The canopy may include mounts for mounting accessories. The canopy may include roof mounts for mounting items to the roof. The roof mounts may be adjustable in location. One of the walls may be a rear wall, and the canopy may include a wheel mount for mounting a wheel to the rear wall.

The canopy may further include fastening means to facilitate fastening to the tray. The canopy may span partially along the tray, and preferably about % of the length of the tray.

The canopy may include a power supply. The power supply may include a battery, battery management controller for actuating the battery upon removal of mains power, inverter and/or accessory sockets for powering accessories from the battery. The power supply may include a charger for charging the batter from mains power, solar, or an alternator of the vehicle.

The canopy may include a lighting system. The lighting system may be powered by the battery. The lighting system may be actuated responsive to opening of a door of the canopy.

The canopy may include a refrigerator powered by the battery. The refrigerator may be an upright refrigerator. The canopy may include storage drawers. The canopy may include a retractable carriage.

The roof, walls and floor may include aluminium panels which are advantageously lightweight and corrosion resistant.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3a is a right side view of the canopy of FIG. 1 with the side doors open;

FIG. 3b is a rear facing sectional view through the line A-A in FIG. 3a;

FIG. 4a is a left side view of the canopy of FIG. 1 with the side doors open;

FIG. 4b is a front facing sectional view through the line B-B in FIG. 3a; and

DETAILED DESCRIPTION OF PREFERRED EMBODIMENTS

Figure 1:
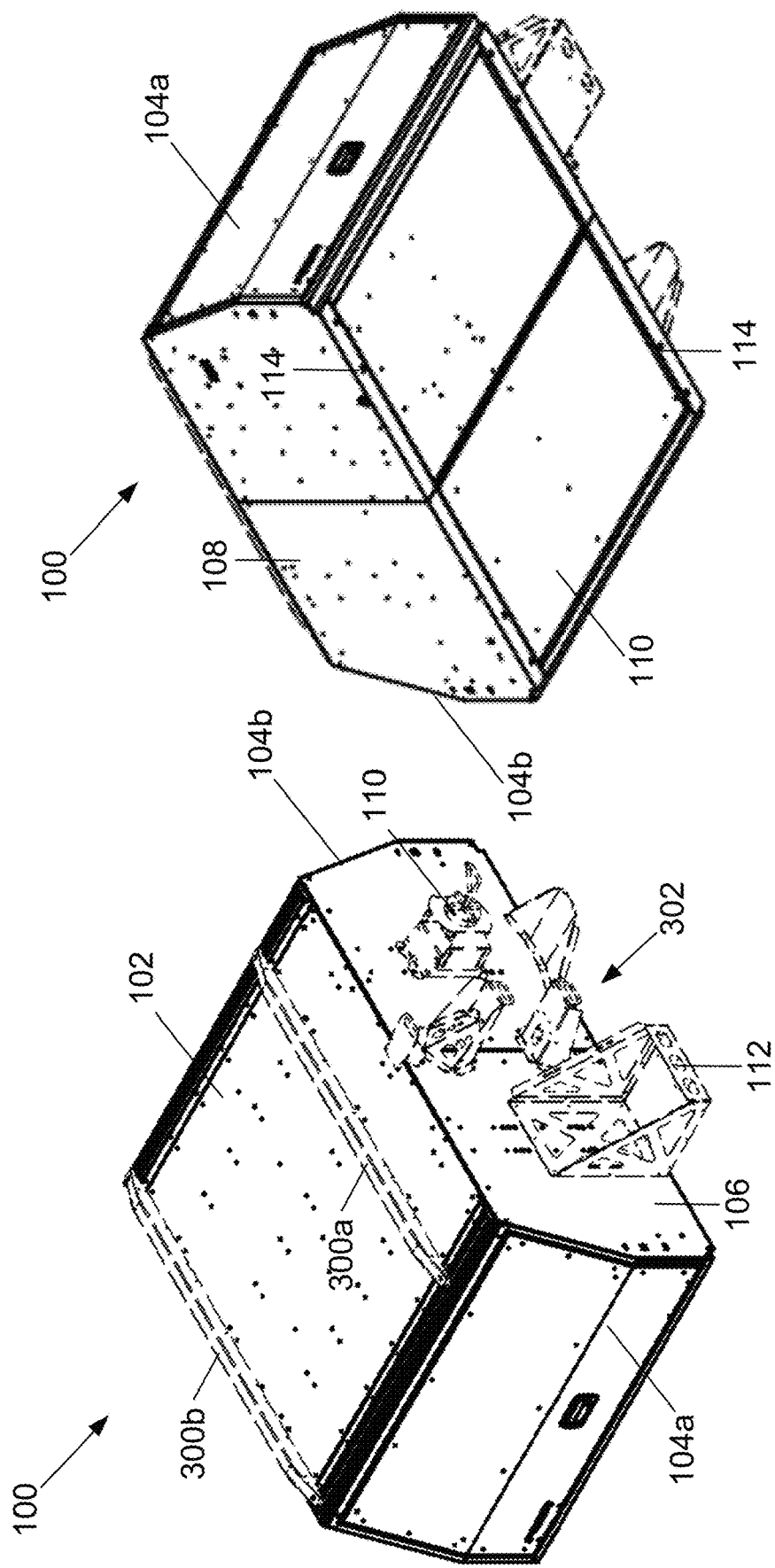
FIG. 1a is an upper rear perspective view of an automotive tray canopy in accordance with an embodiment of the present invention.
FIG. 1b is a lower front perspective view of the automotive tray canopy of FIG. 1.

According to an embodiment of the present invention, there is provided an automotive tray canopy 100, shown in FIG. 1, for fitting to a payload tray of a utility vehicle. The canopy 100 includes a flat rectangular roof 102. Four walls depend from the roof 102, namely left and right sloping side walls 104a, 104b, a rear wall 106 toward the back of the vehicle and a front wall 108 toward the front of the vehicle. The side walls 104 taper inwardly with increasing height.

The portable camping canopy 100a further includes a floor 110 for extending between the four walls and resting on the vehicle tray. Advantageously, the canopy 100 forms a completely sealed internal storage space for safely storing items out of the elements. The roof 102, walls 104 and floor 110 all include aluminium panels which are advantageously lightweight and corrosion resistant.

Figure 2:
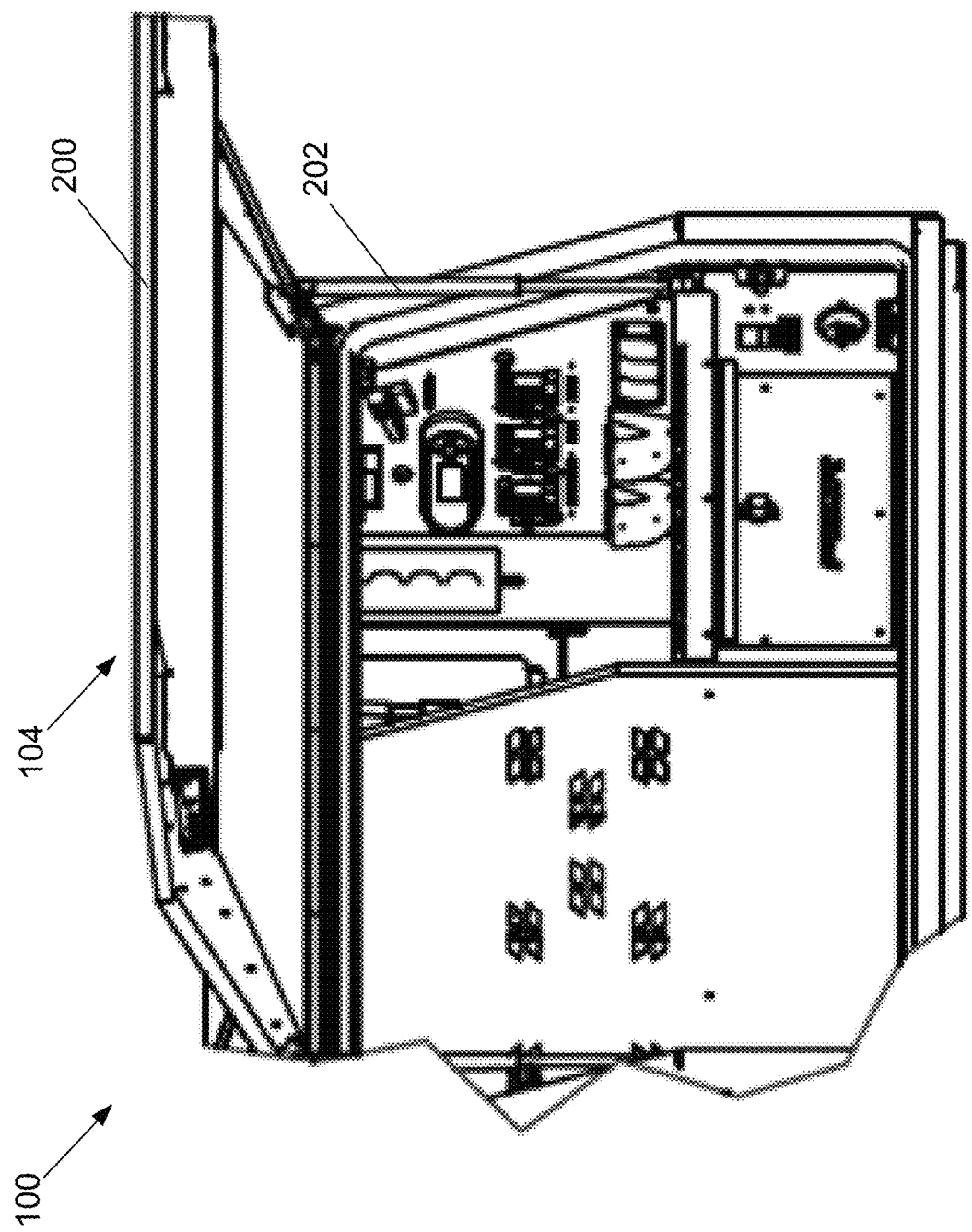
FIG. 2 is a close-up partial side view of the canopy of FIG. 1 with a side door open.

Turning to FIG. 2, each side wall 104 includes a pivoting access door 200. that pivots upward to open and downward to close. An extensible gas adjustment strut 202 can maintain each door 200 at a desired open position. The canopy 100 includes a central locking system for locking each door 200 to secure the canopy 100. The central locking system can be actuated with a key, whereby each door 200 can be locked by locking either one of the doors 200 with the key.

Turning to FIGS. 3 and 4, the canopy 100 includes mounts for mounting accessories. Elaborating further, the canopy includes a pair of parallel roof mounts 300a, 300b for mounting items to the roof 102. The roof mounts 300a, 300b are adjustable in location on the roof 102 so that the spacing between them can be varied as required (see. FIG. 1a).

The canopy 100 also includes rear wall mounts 302 for mounting accessories to the rear wall 106. As can best be seen in FIG. 1a, the wall mounts 302 include a wheel mount 110 for mounting a spare wheel and a fuel container mount 112 for mounting a fuel container.

As can best be seen in FIG. 1b, the canopy 100 further includes fastening means, in the form of spaced apart holes 114 in the periphery of the floor 110, for receiving bolts to facilitate fastening to the vehicle tray.

Turning to FIG. 4, the canopy 100 includes a stand-alone power supply 400. The power supply 400 includes a battery, a battery management controller for actuating the battery upon removal of mains power, an inverter for converting DC battery power to AC, and accessory sockets 402 for powering accessories from the battery. The power supply 400 also includes a charger for charging the battery from mains power, solar panels borne by the canopy 100, and an alternator of the vehicle.

The canopy 100 includes a lighting system 304 powered by the battery as shown in FIG. 3. The lighting system 304 can be actuated responsive to opening of a door 200. The canopy 100 also includes an upright refrigerator 404 powered by the battery.

Figure 5:
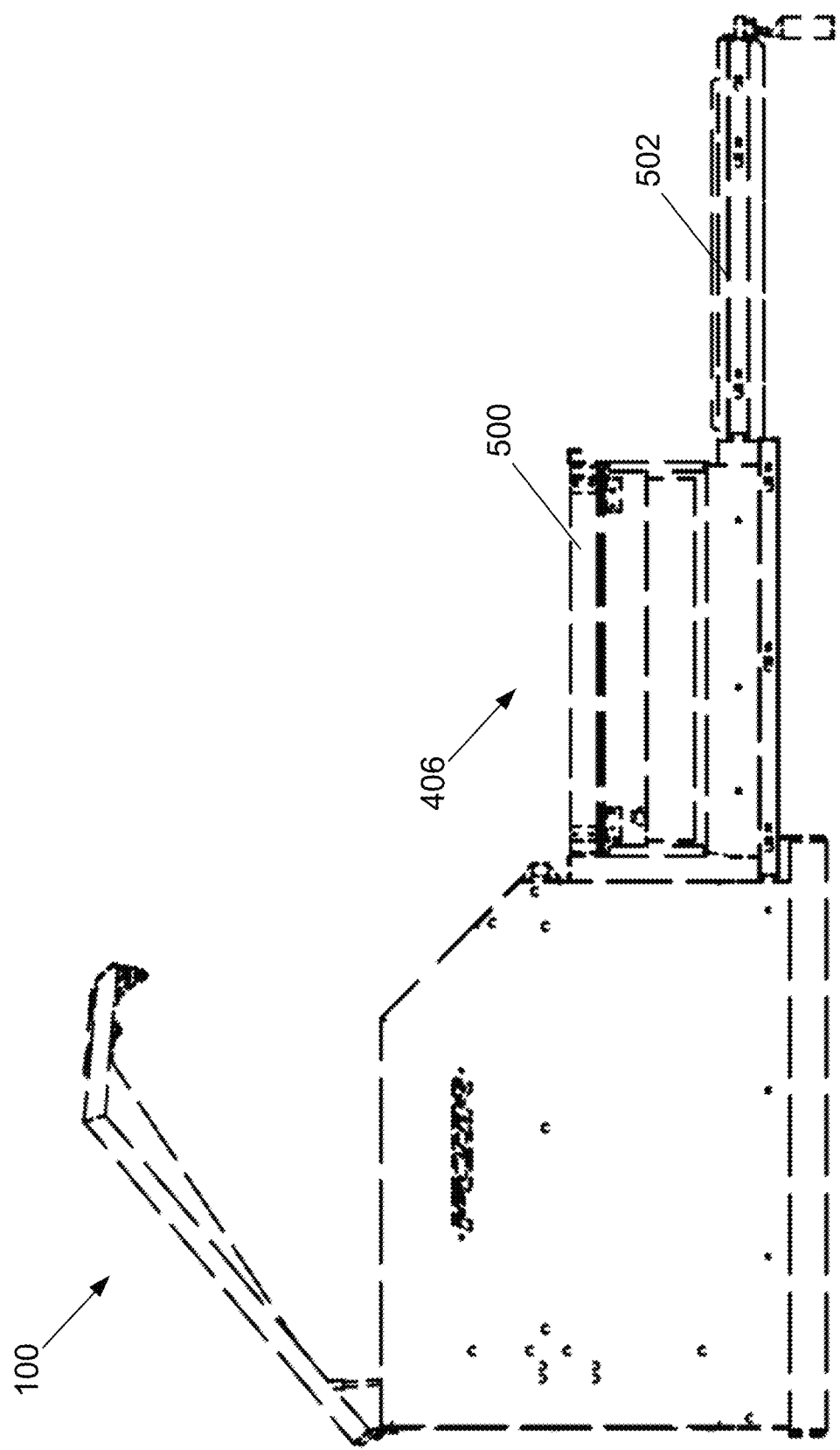
FIG. 5 is an end view showing a retractable carriage of the canopy of FIG. 1.

The canopy 100 also includes a retractable carriage 406 in the form of a kitchen. As can best be seen in FIG. 5, the retractable carriage 406 includes sliding storage drawers 500 and an extensible sliding platform 502.

The canopy 100 also includes a ventilation system, including air vents, for positively pressurizing the internal storage space when the vehicle is in motion.

A person skilled in the art will appreciate that many embodiments and variations can be made without departing from the ambit of the present invention.

The canopy 100 can be of varied size and shape. The canopy 100 can span partially along the vehicle tray, and preferably about ¾ of the length of the tray.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An automotive tray canopy for fitting to a tray of a vehicle, the canopy including:
   a roof;
   four walls depending from the roof;
   a floor for extending between the walls;
   one or more access doors for accessing an interior of the canopy;
   a central locking system for locking the one or more access doors to secure the canopy, wherein the central locking system can be actuated with a key, with each of the one or more access door being locked by locking any one of the access doors with the key;
   a power supply including a battery; and
   a lighting system for lighting the interior of the canopy, the lighting system being configured to be powered by the battery and actuated responsive to opening of the one or more access doors of the canopy,
   wherein the canopy further includes a retractable carriage comprising a kitchen, a plurality of slidable storage drawers that are extensible and retractable with respect to the retractable carriage, and a slidable platform that is extensible and retractable with respect to the plurality of slidable storage drawers, wherein the retractable carriage is extensible and retractable with respect to the canopy in a direction generally perpendicular to a longitudinal axis of the canopy.

2. An automotive tray canopy as claimed in claim 1, wherein the canopy is portable and forms a completely sealed internal storage space for storing items out of the elements.

3. An automotive tray canopy as claimed in claim 1, wherein the canopy includes a ventilation system for positively pressurizing the storage space when the vehicle is in motion.

4. An automotive tray canopy as claimed in claim 1, wherein the walls include two side walls, at least one of the two side walls including a respective one of the access doors.

5. An automotive tray canopy as claimed in claim 4, wherein each of the two side walls includes a respective one of the access doors.

6. An automotive tray canopy as claimed in claim 4, wherein each access door pivots upward and downward.

7. An automotive tray canopy as claimed in claim 4, wherein the side walls taper inwardly with increasing height.

8. An automotive tray canopy as claimed in claim 1, wherein the canopy includes mounts for mounting accessories.

9. An automotive tray canopy as claimed in claim 8, wherein the mounts include roof mounts for mounting items to the roof, the roof mounts being adjustable in location.

10. An automotive tray canopy as claimed in claim 8, wherein one of the walls is a rear wall, and the canopy includes a wheel mount for mounting a wheel to the rear wall.

11. An automotive tray canopy as claimed in claim 1, further including a fastening arrangement to facilitate fastening to the tray so that the canopy spans partially along the tray, and preferably about three-quarters of the length of the tray.

12. An automotive tray canopy as claimed in claim 1, further including a battery management controller for actuating the battery upon removal of mains power, and an inverter and/or accessory sockets for powering accessories from the battery.

13. An automotive tray canopy as claimed in claim 12, wherein the power supply includes a charger for charging the battery from mains power, solar, or an alternator of the vehicle.

14. An automotive tray canopy as claimed in claim 1, further including an upright refrigerator powered by the battery.

15. An automotive tray canopy as claimed in claim 1, further including storage drawers.

16. An automotive tray canopy as claimed in claim 1, wherein the roof, walls, and floor include aluminium panels which are lightweight and corrosion resistant.

17. An automotive tray canopy for fitting to a tray of a vehicle, the canopy including:
- a roof;
- four walls depending from the roof, the four walls including a front wall, a rear wall, and two side walls, each side wall having an access door for accessing an interior of the canopy;
- a floor for extending between the walls;
- a central locking system for locking each access door to secure the canopy, wherein the central locking system can be actuated with a key, with each access door being locked by locking any one of the access doors with the key;
- a power supply including a battery; and
- a lighting system for lighting the interior of the canopy, the lighting system being configured to be powered by the battery and actuated responsive to opening of the one or more access doors of the canopy,
- wherein the canopy further includes a retractable carriage comprising a kitchen, a plurality of slidable storage drawers that are extensible and retractable with respect to the retractable carriage, and a slidable platform that is extensible and retractable with respect to the plurality of slidable storage drawers, wherein the retractable carriage is extensible and retractable with respect to the canopy in a direction generally perpendicular to a longitudinal axis of the canopy.

* * * * *